United States Patent
Tang et al.

(10) Patent No.: US 8,665,396 B2
(45) Date of Patent: Mar. 4, 2014

(54) BACKLIGHT MODULE AND LIQUID CRYSTAL DISPLAY DEVICE

(75) Inventors: GuoFu Tang, Guandong (CN); Yu-chun Hsiao, Guandong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 41 days.

(21) Appl. No.: 13/519,362

(22) PCT Filed: May 31, 2012

(86) PCT No.: PCT/CN2012/076314
§ 371 (c)(1),
(2), (4) Date: Jun. 27, 2012

(87) PCT Pub. No.: WO2013/174032
PCT Pub. Date: Nov. 28, 2013

(65) Prior Publication Data
US 2013/0314645 A1    Nov. 28, 2013

(30) Foreign Application Priority Data

May 22, 2012 (CN) .......................... 2012 1 0160439

(51) Int. Cl.
*G02F 1/1335* (2006.01)

(52) U.S. Cl.
USPC .................... 349/62; 349/65; 349/67; 349/69

(58) Field of Classification Search
USPC .......................................... 349/62, 65, 67, 69
See application file for complete search history.

(56) References Cited

U.S. PATENT DOCUMENTS 5,528,709 A * 6/1996 Koike et al. ...................... 385/14
2006/0290844 A1* 12/2006 Epstein et al. ................ 349/113

\* cited by examiner

*Primary Examiner* — Phu Vu
(74) *Attorney, Agent, or Firm* — Andrew C. Cheng

(57) ABSTRACT

The present invention discloses a backlight module which includes a waveguide and a spot light source. Wherein the waveguide includes an incident face and a refractive surface adjacent to the waveguide, the light beam emitted from the spot light source will be directed toward the refractive surface, and then the light beam enters the waveguide after the light beam is refracted by the refractive surface. The present invention also discloses a liquid crystal display device incorporated with the backlight module disclosed. The backlight module can readily improve the corner vignette and enhanced with more evenly distributed brightness across the waveguide. The liquid crystal display device incorporated with the module also enjoy the evenly distributed brightness.

11 Claims, 3 Drawing Sheets

BACKLIGHT MODULE AND LIQUID CRYSTAL DISPLAY DEVICE

FIELD OF THE INVENTION

The present invention relates to a technical field of liquid crystal display, and more particularly to a backlight module and a liquid crystal display module device incorporated with the backlight module.

DESCRIPTION OF PRIOR ART

The liquid crystal display device is featured with low radiation, compact, slim and low energy exhaustion, it has been widely used in mobile phone, personal digital assistant, notebook computer, personal computer and television. However, the liquid crystal display device does not generate light, as a result, it has to be incorporated with a so called backlight module so as to display the information carried by the liquid crystal display device by the light source projected from the backlight module. The backlight will evenly distribute the light source across the liquid crystal display module.

Because the requirements from the customers become stronger and stronger in the fields of low energy exhaustion, durability, as well as environment, the light emitting diode (LED) has been widely used to replace the CCFL (cold-cathode fluorescent lamp) and has become a key light source in the backlight module.

In the existing backlight module, the LED is generally disposed on a side of a waveguide. However, in order to provide a bright illumination to the liquid crystal display panel, more than scores of LED have to be arranged alone the side of the waveguide. With the development of the LED technology, the LED can be arranged on a corner of the waveguide facing directly toward the incident surface of the waveguide. In generally, the light emitting angle of the LED is less than one hundred twenty (120) degrees, and the refractive index is about 1.49. As a result, the angle of the light beam projected from the LED will become about eighty (80) degrees after the light beam entered the waveguide. As a result, the corner of the liquid crystal display module will experience a corner vignette and this will negatively affect the evenness of brightness of the liquid crystal display module.

SUMMARY OF THE INVENTION

The present invention is to address the vignette issue of the LED waveguide and which consequently affects the evenness of the brightness of the backlight module.

In order to resolve the prior art issue, the present invention provides a backlight module which includes a waveguide and a spot light source. Wherein the waveguide includes an incident face and a refractive surface adjacent to the waveguide. Wherein the light beam emitted from the spot light source will be directed toward the refractive surface, and then the light beam enters the waveguide after the light beam is refracted by the refractive surface.

According to a preferable embodiment of the present invention, wherein the spot light source is a LED, and the emitting direction of the light is toward the refractive surface.

According to a preferable embodiment of the present invention, wherein the waveguide has a chamfered corner, and wherein a surface on the chamfered corner is served as an incident surface.

According to a preferable embodiment of the present invention, wherein the backlight module includes a plurality of spot light sources, and the waveguide includes a plurality of incident surfaces, each of the spot light source is arranged to match up with a corresponding incident surface.

According to a preferable embodiment of the present invention, wherein the backlight module includes a back board having a sidewall partially inclined toward the incident surface of the waveguide at its top, and the top includes the refractive surface adjacent to the spot light source.

According to a preferable embodiment of the present invention, wherein the waveguide includes a bottom surface adjacent to the incident surface, the backlight module includes an aluminum excursion and a refractive mirror disposed on the bottom surface, the aluminum excursion is arranged between the spot light source and the back board.

According to a preferable embodiment of the present invention, wherein the backlight module includes a plastic frame which includes the sidewall inclined toward the refractive surface which is located adjacent to the spot light source.

According to a preferable embodiment of the present invention, wherein the refractive surface is a planar surface or a curvilinear surface.

In order to resolve the prior art issue, the present invention provides a backlight module configured with a waveguide, a spot light source, a back board, and a plastic frame. Wherein the waveguide includes an incident surface, the backlight module including a refractive surface located adjacent to the spot light source, and inclined toward the incident surface. Wherein the light beam projected from the spot light source is directed toward the refractive surface, and then enters into the waveguide through the incident surface. Wherein the refractive surface is located at the back board or a side surface of the spot light source. Wherein the spot light source is a light emitting diode (LED), and the light beam projected from the LED is directed toward the refractive surface. Wherein the waveguide has a chamfered corner, and a surface on the chamfered corner serves as the incident surface, and the refractive surface is planar or curvilinear.

According to a preferable embodiment of the present invention, wherein the backlight module includes a plurality of spot light sources, and the waveguide includes a plurality of incident surfaces, each of the spot light source is arranged to match up with a corresponding incident surface.

According to a preferable embodiment of the present invention, wherein the back board has a sidewall partially inclined toward the incident surface of the waveguide at its top, and the top includes the refractive surface adjacent to the spot light source.

According to a preferable embodiment of the present invention, wherein the waveguide includes a bottom surface adjacent to the incident surface, the backlight module includes an aluminum excursion and a refractive mirror disposed on the bottom surface, the aluminum excursion is arranged between the spot light source and the back board.

In order to resolve the prior art issue, the present invention provides a liquid crystal display device including a backlight module which includes a waveguide and a spot light source. Wherein the waveguide includes an incident face and a refractive surface adjacent to the waveguide, the light beam emitted from the spot light source will be directly toward the refractive surface, and then the light beam enters the waveguide after the light beam is refracted by the refractive surface.

According to a preferable embodiment of the present invention, wherein the backlight module includes a back board having a sidewall partially inclined toward the incident surface of the waveguide at its top, and the top includes the refractive surface adjacent to the spot light source.

According to a preferable embodiment of the present invention, wherein the waveguide includes a bottom surface adjacent to the incident surface, the backlight module includes an aluminum excursion and a refractive mirror disposed on the bottom surface, the aluminum excursion is arranged between the spot light source and the back board.

The backlight module and the liquid crystal display device made in accordance with the present invention can readily resolve the vignette of the liquid crystal display panel. The backlight module further enhances the brightness of the liquid crystal display panel to a higher level.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated herebelow in accompanied drawings. Apparently, with the spirit of the embodiments disclosed, person in the skilled in the art can readily come out with other modifications as well as improvements without undue experiment. In addition, other drawings can be readily achieved based on the disclosed drawings. Wherein.

DETAILED DESCRIPTION OF PREFERRED EMBODIMENTS

Figure 1:
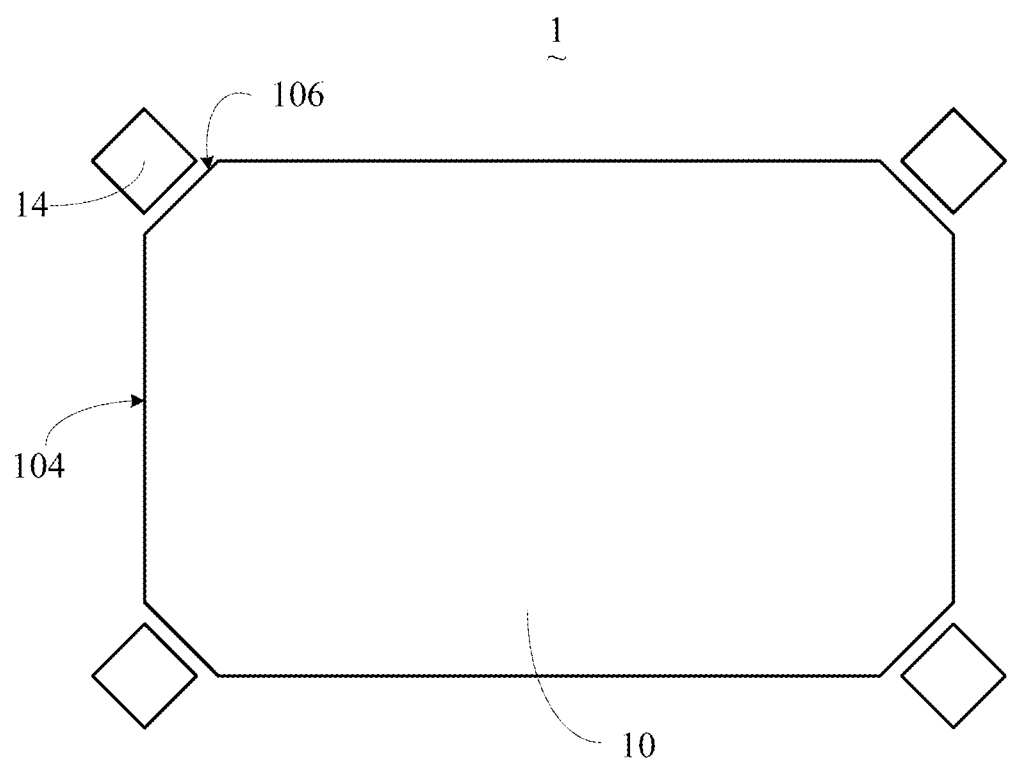
FIG. 1 is top view of a first preferable embodiment of a waveguide and a spot light source of a backlight module made in accordance with the present invention.

In order clearly explain the technology of the embodiment illustrated in the present invention, a brief and concise description will be given along with the accompanied drawings. Apparently, the embodiments illustrated in the drawings are merely some typical embodiments and which can be readily modified by the skilled in the art without any additional laborious efforts so as to transform them into other drawings.

First Preferred Embodiment

The present invention discloses a backlight module 1. Please referring to FIGS. 1 and 2, the backlight module 1 includes a waveguide 10, a refractive film 11, a back board 12, an aluminum excursion 13 and a spot light source 14.

The waveguide 10 has a rectangular configuration and the main purpose of a waveguide 10 is to convert a spot light source of a light strip resource into an evenly distributed surface light. The waveguide 10 includes a top surface 100, a bottom surface 102, and a plurality of side surfaces 104. The top surface 100 is a light emitting surface of the waveguide 10, and the bottom surface 102 is opposite to the top surface 100. The side surfaces 104 are arranged between the top surface 100 and the bottom surface 102. The waveguide 10 can be made from polymethylmethacrylate (aka PMMA) or polycarbonate (PC).

The waveguide 10 have four chamfered corners. The side surface of the chamfered corner is served as an incident surface 106 of the waveguide 10. The external light can enter the waveguide 10 from those incident surfaces 106, and will emit out of the light emitting surface 100 after one or more than once refraction.

The refractive film 11 is disposed adjacent to the bottom surface 102 of the waveguide 10. The main function of the refractive film 11 is to redirect the light beam emitted from the bottom surface 102 reenter into the waveguide 10 so as to enhance the efficiency of the waveguide 10.

The back board 12 is made from metal board and the main purpose of it is to support corresponding components of the backlight module. In addition, the back board 12 can serve as a heatsink to dissipate heat generated from those electronic components. The aluminum excursion 13 is arranged between the spot light source 14 and the back board 12. The aluminum excursion 13 can effectively transfer the heat generated from the spot light source 14 to the back board 12. As a result, the heat generated by the spot light source 14 can be properly dissipated. The back board 12 includes a sidewall 122 and a bottom wall 124. The sidewall 122 extends upward from the bottom wall 124, and with its top inclining toward the incident surface 106 of the waveguide 10. The top of the sidewall 122 includes a refractive surface 126 located adjacent to the spot light source 14. The refractive surface 126 can be formed by physic vaporization deposit or coated with a refractive film. In the present embodiment, the refractive surface 126 is a planar. Of course, the refractive surface 126 can be curvilinear.

Figure 2:
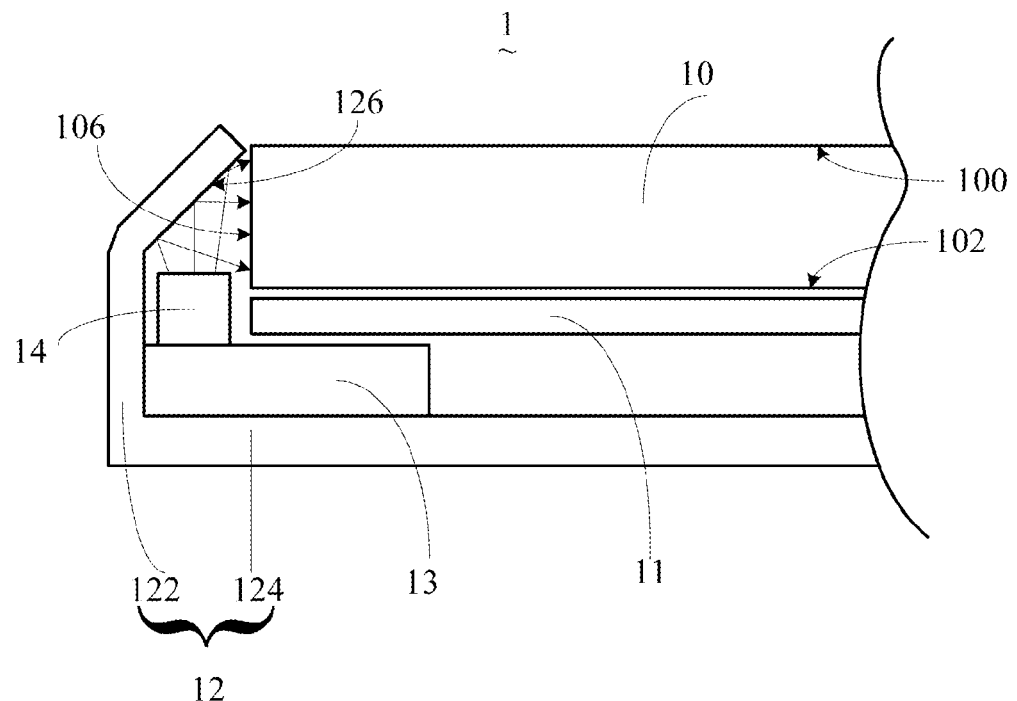
FIG. 2 is a side elevational view of the backlight module made in according to the first embodiment of the present invention.
Figure 3:
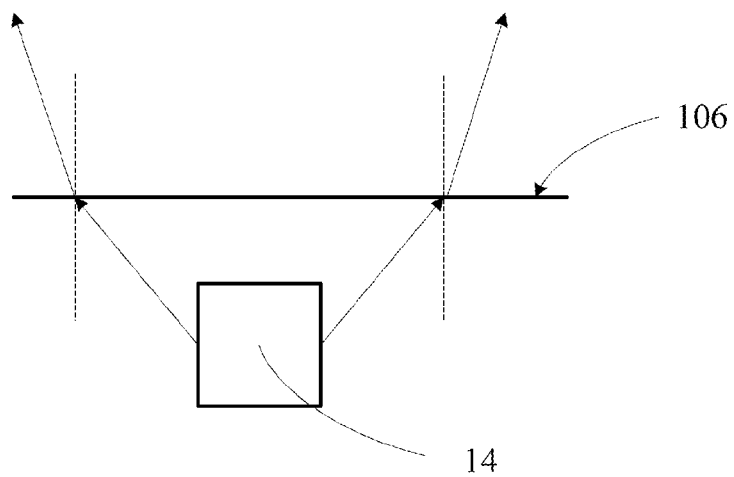
FIG. 3 is an illustration depicting a path of light originating from a spot light source, and then entering the waveguide after a refraction.

The spot light source 14 is a light emitting diode which emits a light beam with a pre-determined direction and angle. In the present embodiment, the spot light source 14 is projected to the refractive surface 126. As shown in FIGS. 2 and 3, the light beam projected by the spot light source 14 is directed to the refractive surface 126 which is inclined toward the incident surface 106. Eventually, the light beam enters the waveguide 10 through the incident surface 106. The light beam projected from the spot light source 14 will become a little bit diffused after the light beam is refracted by the refractive surface 126. Accordingly, the angle of the light beam becomes wider as compared to original. As the light beam is diffused, the entry angle of the light beam into the waveguide 10 also becomes larger as compared to the existing art. According to the experiment, the angle of the light beam entered the waveguide 10 through the incident surface 106 could exceed eighty (80) degrees. Accordingly, this arrangement can effectively improve the corner vignette issue which prior arts suffered, while improve the evenness of brightness of the backlight module 1.

In the current embodiment, those four chamfered corners are all served as the incident surfaces 106, and the backlight module 1 includes four spot light sources 14. Those four spot light sources 14 are arranged with respect to those four chamfered corners 106.

Second Preferred Embodiment

Figure 4:
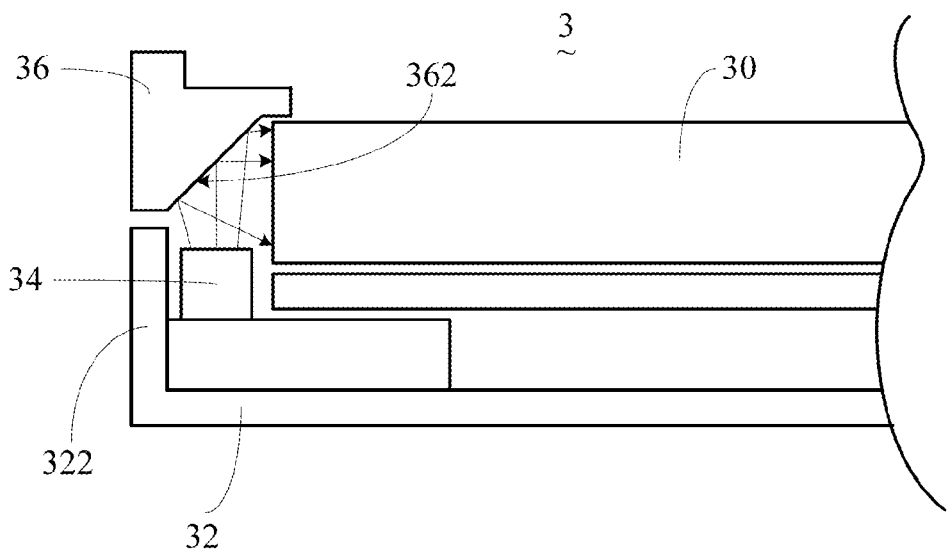
FIG. 4 is a side elevational view of the backlight module made in according to the second embodiment of the present invention.

The present invention further discloses a backlight module. Referring to FIG. 4, the backlight module 3 has a generally similar configuration as the backlight module 1 in accordance with the first embodiment. The difference resides in the back board 32 of the backlight module 3 has a linear or elongate configuration. The backlight module 3 further includes a plastic frame 36 which incorporates with a refractive surface 362. The refractive surface 362 is inclining toward an incident surface 306 of the waveguide 30, and located adjacent to a spot light source 34. The refractive surface 362 directs a light beam projected from the spot light source 34 into a waveguide 30 directly.

Similarly, as compared to the existing prior art, the backlight module 3 can also improve the corner vignette of the waveguide 30, and improve the evenness of the brightness of the backlight module 3.

Figure 5:
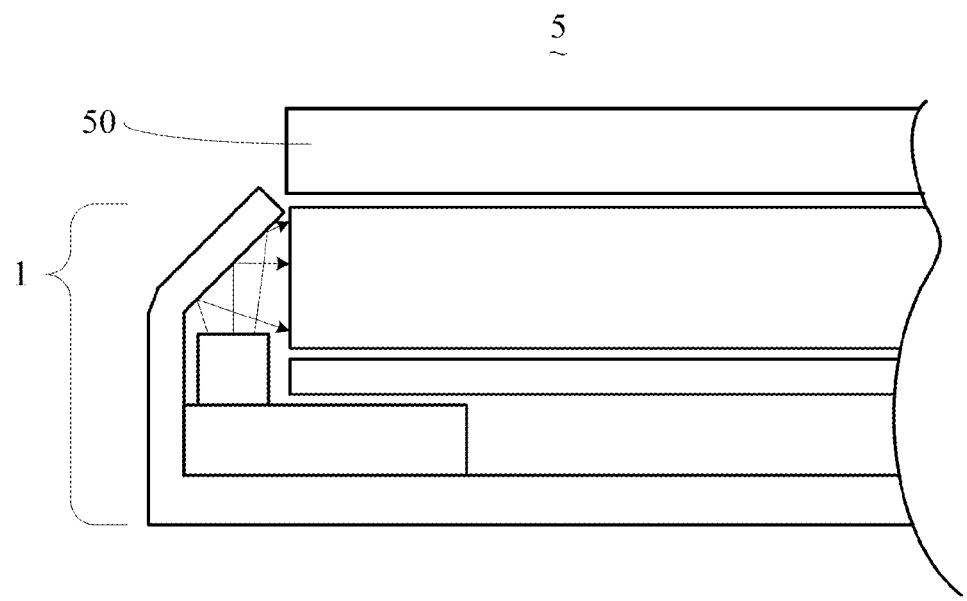
FIG. 5 is a side elevational view of a liquid crystal display device incorporated with the backlight module disclosed above.

The present invention further discloses a liquid crystal display device. Referring to FIG. 5, the liquid crystal display device 5 includes a liquid crystal display panel 50, and a backlight module 1 used to illuminate the panel 50. Wherein the backlight module 1 can also be replaced with the backlight module 3.

In conclusion, the backlight module can readily improve the corner vignette and enhanced with more evenly distributed brightness across the waveguide. The liquid crystal display device incorporated with the module also enjoy the evenly distributed brightness.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

The invention claimed is:

1. A backlight module, including a waveguide and a spot light source, wherein the waveguide includes an incident face and a refractive surface adjacent to the waveguide, the light beam emitted from the spot light source will be directed toward the refractive surface, and then the light beam enters the waveguide after the light beam is refracted by the refractive surface; wherein the backlight module includes a plastic frame which includes the sidewall inclined toward the refractive surface which is located adjacent to the spot light source.

2. The backlight module as recited in claim 1, wherein the spot light source is a LED, and the emitting direction of the light is toward the refractive surface.

3. The backlight module as recited in claim 1, wherein the waveguide has a chamfered corner, and wherein a surface on the chamfered corner is served as an incident surface.

4. The backlight module as recited in claim 1, wherein the backlight module includes a plurality of spot light sources, and the waveguide includes a plurality of incident surfaces, each of the spot light sources is arranged to match up with a corresponding incident surface.

5. The backlight module as recited in claim 1, wherein the backlight module includes a back board having a sidewall partially inclined toward the incident surface of the waveguide at its top, and the top includes the refractive surface adjacent to the spot light source.

6. The backlight module as recited in claim 5, wherein the waveguide includes a bottom surface adjacent to the incident surface, the backlight module includes an aluminum excursion and a refractive mirror disposed on the bottom surface, the aluminum excursion is arranged between the spot light source and the back board.

7. The backlight module as recited in claim 1, wherein the refractive surface is a planar surface or a curvilinear surface.

8. A backlight module configured with a waveguide, a spot light source, a back board, and a plastic frame, wherein the waveguide includes an incident surface, the backlight module including a refractive surface located adjacent to the spot light source, and inclined toward the incident surface, wherein the light beam projected from the spot light source is directed toward the refractive surface, and then enters into the waveguide through the incident surface, wherein the refractive surface is located at the back board or a side surface of the spot light source, wherein the spot light source is a light emitting diode (LED), and the light beam projected from the LED is directed toward the refractive surface, wherein the waveguide has a chamfered corner, and a surface on the chamfered corner serves as the incident surface, and the refractive surface is planar or curvilinear; wherein the back board has a sidewall partially inclined toward the incident surface of the waveguide at its top, and the top includes the refractive surface adjacent to the spot light source; wherein the waveguide includes a bottom surface adjacent to the incident surface, the backlight module includes an aluminum excursion and a refractive mirror disposed on the bottom surface, the aluminum excursion is arranged between the spot light source and the back board.

9. The backlight module as recited in claim 8, wherein the backlight module includes a plurality of spot light sources, and the waveguide includes a plurality of incident surfaces, each of the spot light sources is arranged to match up with a corresponding incident surface.

10. A liquid crystal display device including a backlight module which includes a waveguide and a spot light source, wherein the waveguide includes an incident face and a refractive surface adjacent to the waveguide, the light beam emitted from the spot light source will be directly toward the refractive surface, and then the light beam enters the waveguide after the light beam is refracted by the refractive surface; wherein the backlight module includes a back board having a sidewall partially inclined toward the incident surface of the waveguide at its top, and the top includes the refractive surface adjacent to the spot light source; wherein the waveguide includes a bottom surface adjacent to the incident surface, the backlight module includes an aluminum excursion and a refractive mirror disposed on the bottom surface, the aluminum excursion is arranged between the spot light source and the back board.

11. A backlight module, including a waveguide and a spot light source, wherein the waveguide includes an incident face and a refractive surface adjacent to the waveguide, the light beam emitted from the spot light source will be directed toward the refractive surface, and then the light beam enters the waveguide after the light beam is refracted by the refractive surface;
wherein the backlight module includes a back board having a sidewall partially inclined toward the incident surface of the waveguide at its top, and the top includes the refractive surface adjacent to the spot light source; and
wherein the waveguide includes a bottom surface adjacent to the incident surface, the backlight module includes an aluminum excursion and a refractive mirror disposed on the bottom surface, the aluminum excursion is arranged between the spot light source and the back board.

\* \* \* \* \*